United States Patent [19]

Peng et al.

[11] Patent Number: 5,128,393
[45] Date of Patent: Jul. 7, 1992

[54] IMIDAZOLINE AMINE-EPOXY ADDUCT AS A PIGMENT DISPERSANT

[75] Inventors: Stephen C. Peng, Utica; Taddesse Gebregiorgis, Sterling Heights, both of Mich.

[73] Assignee: E. I. Du Pont de Nemours and Company, Wilmington, Del.

[21] Appl. No.: 714,221

[22] Filed: Jun. 11, 1991

Related U.S. Application Data

[62] Division of Ser. No. 380,543, Jul. 22, 1989, abandoned.
[51] Int. Cl.$^5$ .............................................. C08K 3/20
[52] U.S. Cl. .................................. 523/402; 523/415; 523/456
[58] Field of Search ................. 523/402, 415, 456

[56] References Cited

FOREIGN PATENT DOCUMENTS 12335975 6/1971 United Kingdom .

*Primary Examiner*—Paul R. Michl
*Assistant Examiner*—Edward J. Cain
*Attorney, Agent, or Firm*—Hilmar L. Fricke

[57] ABSTRACT

A pigment dispersant useful in cathodic electrocoat compositions is disclosed. The pigment dispersant is the reaction product of an organic monoepoxide or polyepoxide with a primary amine containing an imidazoline moiety. This pigment dispersant allows the maximazation of pigment to binder ratios and the minimization of volatile organic content (VOC) in electrocoat baths.

6 Claims, No Drawings

IMIDAZOLINE AMINE-EPOXY ADDUCT AS A PIGMENT DISPERSANT

This is a continuation application of Ser. No. 07/380,543 filed Jul. 22, 1989, now abandoned.

TECHNICAL FIELD

The field of art to which this invention pertains is electrodepositable cationic baths containing a pigment dispersant which is the reaction product of an organic monoepoxide or polyepoxide with a primary amine containing an imadazoline moiety.

BACKGROUND

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. The article to be coated is the cathode in the electrical circuit with the counter-electrode being the anode.

Resin compositions used in cathodic electrodeposition baths are also well known in the art. These resins are typically manufactured from polyepoxide resins which have been chain extended and adducted to include a nitrogen. The nitrogen is typically introduced through reaction with an amine compound. Typically these resins are blended with a crosslinking agent and then neutralized with an acid to form a water emulsion which is usually referred to as a principal emulsion.

The principal emulsion is combined with a pigment paste, coalescent solvents, water, and other additives (usually at the coating site) to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a set amount of time. The object is rinsed with deionized water and the coating is cured typically in an oven at sufficient temperature to produce crosslinking.

The prior art of cathodic electrodepositable resin compositions, coating baths, and cathodic electrodeposition processes are disclosed in U.S. Pat. Nos. 3,922,253; 4,419,467; 4,137,140; and 4,468,307.

The pigment dispersant is a very important part of an electrocoat primer composition. The dispersion process involves the separation of the primary pigment particles from their agglomerates or aggregates, the displacement of occluded air and absorbed water, and the wetting and coating of the pigment surfaces with the dispersion resin. Ideally, each primary particle, having been mechanically separated during dispersion, is also stabilized against flocculation. If the pigment particles are not properly dispersed and stabilized in the paint, the advantages built into the pigment by the manufacturer may be lost. For instance, the pigment may settle in the electrodeposition bath which can result in loss of corrosion protection of the substrate. In addition, surface appearance, operating characteristics and so forth may be adversely impacted by inadequate pigment dispersion.

The better the pigment dispersant, the less dispersant is required and thus the pigment to binder ratio can be increased. This can result in a savings on dispersant costs, improved processability, increased production capacity, and lower volatile organic concentration (VOC) in the electrodeposition bath. Current commercial pigment dispersants used in cathodic electrocoat processes typically are polyepoxide resins containing either onium salts or amine salts. Using the pigment dispersants known in the prior art, the maximum pigment to binder ratio that can be obtained is 3:1. These pigment dispersants also require the use of solvents which raise the VOC of the electrocoat bath. Current commercial pigment dispersants contain at least 30 to 40% solvent.

What is needed is a pigment dispersant which will allow a maximazation of the pigment to binder ratio, and a minimization of the amount of solvent required. This could result in a cost savings for dispersants, improved processability, and a lower VOC in the electrocoat bath.

The closest prior art that we are aware of is U.S. Pat. No. 4,710,561 (hereinafter the '561 patent) assigned to Kansai. This patent discloses an imidazoline epoxy ether resin. But this resin is inferior to our novel dispersant in the following ways: (1) the epoxy ether can not be made water dispersable upon protonating with an organic acid; (2) the etherification reaction is slow and would result in considerable side reactions which causes a higher molecular weight resin, and a higher viscosity; (3) the pH is lower and therefore is less desirable for cathodic electrocoating processes; and (4) poorer mechanical stability.

SUMMARY OF THE INVENTION

It has been discovered that by using a novel pigment dispersant that pigment to binder ratios can be increased to 12:1 or more. This is a very surprising four fold improvement over the current commercial pigment dispersants which require a pigment to binder ratio of about 3:1. In addition, our novel pigment dispersant allows us to minimize or eliminate the use of solvent in the pigment dispersant.

The pigment dispersant of our invention is the reaction product of an organic monoepoxide or polyepoxide with a primary amine containing an imidazoline moiety. The resulting imidazoline amine epoxy adduct also has the following additional properties: (1) it can be made water dispersible upon protonating with an organic acid; (2) its amination reaction is fast, resulting in little or no side reactions; (3) it has a low viscosity; (4) it has excellent mechanical stability; and (5) it can be made completely soluble in water.

DETAILED DESCRIPTION OF THE INVENTION

Our invention relates to a novel pigment dispersant. This pigment dispersant is potentially usable in a variety of different coatings applications such as spray, dip, roller coat, and so forth. Nevertheless, our experimentation thus far has focused upon the use of our novel pigment dispersant in cathodic electrocoat systems. Therefore, the remainder of our specification is directed toward cathodic electrocoat applications of the pigment dispersant. This should not be interpreted as limiting the scope of potential applications for the dispersant.

As previously mentioned, it is well known that most principal emulsions in cathodic electrodeposition baths has a binder resin which is an epoxy amine adduct blended with a cross-linking agent and neutralized with an acid in order to get a water soluble product. Our novel pigment dispersant is potentially usable with a variety of different cathodic electrocoat binder resins, but our preferred binder resin is the typical epoxy amine adduct of the prior art. These resins are disclosed in U.S. Pat. No. 4,419,467 which is incorporated herein by reference.

Likewise our preferred crosslinkers for the above-mentioned binder resins are also well known in the prior art. They are aliphatic and aromatic isocyanates such as hexamethylene diisocyanate, toluene diisocyanate, methylene diphenyl diisocyanate and so forth. These isocyanates are pre-reacted with a blocking agent such as oximes and alcohols which block the isocyanate functionality (i.e. the crosslinking functionality). Upon heating the oximes or alcohols deblock generating free isocyanate which in turn reacts with the hydroxy functionality of the backbone resin to give crosslinking. These crosslinking agents are also disclosed in U.S. Pat. No. 4,419,467. The neutralization of the epoxy-amine resin with an acid to attain its cationic character is likewise well known in the art. The resulting binder (or backbone) resin is combined with pigment paste, deionized water and additives (e.g. anti-cratering agents, plasticizers and so forth) to form the electrocoat paint bath.

The cationic resin and the blocked isocyanate are the principal resinous ingredients in the principal emulsion and are usually present in amounts of about 30 to 50 percent by weight of solids.

Besides the resinous ingredients described above, the electrocoating compositions of our invention contain a pigment which is incorporated into the composition in the form of a paste. The pigment paste is prepared by grinding pigments into our novel pigment dispersant resin along with optional additives such as wetting agents, surfactants, and defoamers. Pigment dispersants are well known in the art. After grinding, the particle size of the pigment should be as small as practical, generally, a Hegman grinding gauge of about 6 to 8 is usually employed.

Pigments which can be employed in the practice of our invention include titanium dioxide, basic lead silicate, strontium chromate, carbon black, iron oxide, clay and so forth. These are the pigments typically used in automotive primers.

Our novel pigment dispersant is the reaction product of an organic monoepoxide or polyepoxide with a primary amine containing an imidazoline moiety. The primary amine with the imidazoline moiety (hereinafter imidazoline amine) is a primary amine of the following structure:

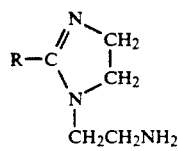

where R is $C_8$-$C_{24}$ alkyl. This compound is made by reacting carboxylic acids of the formula:

R—C—OH where R is defined as above with diethylenetriamine. The carboxylic acid is added slowly to the diethylenetriamine in the presence of a solvent to generate heat of nuetralization. After heat of neutralization, the mixture is then heated under reflux to 150°–160° C. until the water of condensation is completely removed. The solvent is then removed under reduced pressure to give the final product (i.e. the imidazoline amine).

This imidazoline amine can then be reacted with potentially any monoepoxide or polyepoxide. Examples of monoepoxides include aliphatic monoepoxides, aromatic monoepoxides and cyloaliphatic monoepoxides. Monoepoxides are available commercially from Shell Chemical Company under the trade name Cardura E ® and from Ciba Geigy Chemical Company under the trade name Araldite ®. Our preferred monoepoxide has the formula:

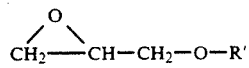

where R' is $C_{12}$-$C_{14}$ alkyl. It is available from Ciba Geigy Chemical Company under the trade name Araldite DY025 ®. The reaction product of the imidazoline amine and the Araldite DY025 ® has the following formula:

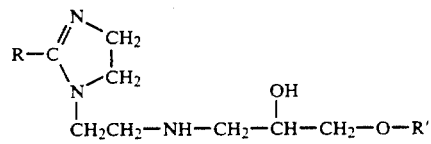

where R and R' are defined as above.

It is also possible to react the imidazoline amine compound with polyepoxide resins. These polyepoxide resins can be aromatic, aliphatic and cycloaliphatic. The polyepoxide resins which can be used with our invention are also well known in the art. They are polymeric resinous materials containing two or more 1,2 epoxy groups per molecule. The preferred polepoxides are polyglycidyl ethers of polyhydric phenols such as bisphenol A. These can be produced by etherification of a pholphenol with an epihalohydrin or dihalohydrin such as epichlorohydrin or dichlorohydrin in the presence of alkali. These polyepoxides are available from Shell Chemical Company under the trade name Epon ®, Dow Chemical Company under the trade name DER ®, or Ciba Geigy Chemical Corporation under the trade name Araldite ®.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol, 1,4-cyclohexanediol, 1,2-bis(hydroxymethyl)cyclohexane, 1,3-bis(-hydroxymethyl)cyclohexane, and hydrogenated bisphenol A.

Examples of other polyepoxides are polyglycidyl ethers of polyhydric alcohols, such as ethylene glycol, diethylene glycol, triethylene glycol, 1,2-propylene glycol, 1,3 propylene glycol, 1,4-butylene glycol, 1,5-pentanediol and the like.

Another polyepoxide which can be used in the practice of this invention include a polyglycidyl ether of polyhydric phenol polyalkoxylate.

It is important to react the imidazoline amine compound and the epoxy stoichemitrically. If there is excess amine-imidazoline the dispersant contains unreacted imidazoline amine which makes the final coating water sensitive and results in physical defects such as pinholing. If there is excess epoxy then the reaction will lead to high viscosity or even gellation.

The reaction between the imidazoline amine compound and the epoxy takes place by bringing the two into contact at room temperature and then raising the temperature to about 180° F. and allowing the reaction to exotherm to about 200° F. The reaction is then held at this temperature until the epoxy equivalent weight approaches infinity. This normally takes about 2 hours.

Reacting the imidazoline amine compound and epoxy under the reaction conditions described above gives a reaction product with the following characteristics: (1) it can be made water dispersible upon protonating with an organic acid; (2) its amination reaction is fast, resulting in little or no side reactions; (3) it has a low viscosity; (4) it has excellent mechanical stability; and (5) it can be made completely soluble in water.

This product is then nuetralized with acid in order to obtain a water soluble product. Our preferred neutralization acid is lactic acid.

The pigment-to-resin weight ratio in the electrocoat paint bath is very important and should be preferably less than 50:100, more preferably less than 40:100, and usually about 20 to 40:100. Higher pigment-to-resin solids weight ratios have also been found to adversely affect coalescence and flow.

The coating compositions of the invention can contain optional ingredients such as wetting agents, surfactants, defoamers and so forth. Examples of surfactants and wetting agents include alkyl imidazolines such as those available from Ciba-Geigy Industrial Chemicals as Amine C ®, acetylenic alcohols available from Air Products and Chemicals as Surfynol 104 A ®. These optional ingredients, when present, constitute from about 0 to 20 percent by weight of resin solids. Plasticizers are optional ingredients because they promote flow. Examples are high boiling water immiscible materials such as ethylene or propylene oxide adducts of nonyl phenols or bisphenol A. Plasticizers can be used and if so are usually used at levels of about 0 to 15 percent by weight resin solids.

Curing catalysts such as tin catalysts are usually present in the composition. Examples are dibutyltin dilaurate and dibutyltin oxide. When used, they are typically present in amounts of about 0.05 to 2 percent by weight tin based on weight of total resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water. generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

EXAMPLES

The following examples all disclose the preparation of pigment dispersants and cathodic electrocoat baths made from such dispersants. In all the following examples the imidazoline amine compound which is the precursor to the pigment dispersant has the following formula:

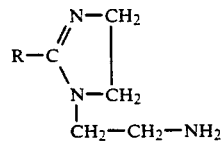

where R is $C_{12}$-$C_{16}$. This compound is hereinafter referred to as the "imidazoline amine compound" and is made as described supra page 7.

The resinous binder that was used in all the following examples is a basic amine epoxy adduct blended with a blocked isocyanate crosslinker and nuetralized with an acid. These cathodic electodepositable resins are well known in the prior art. The particular resin used in our examples is disclosed in U.S. Pat. No. 4,419,467 which is incorporated herein by reference. This nuetralized epoxy amine resin will be referred to hereinafter as the '467 binder resin.

EXAMPLE 1

Preparation of monoepoxide-imidazoline adduct

This adduct was prepared from the following ingredients.

| Ingredients | Grams | Solids |
|---|---|---|
| Epoxy #8 ® (monoepoxy from Ciba) | 2000 | 2000 |
| Imidazoline amine (described above) | 1874 | 1874 |

The Epoxy #8 ® and imidazoline were charged to a reaction kettle and heated with a nitrogen sparge to 150° F. to initiate an exotherm with a peak temperature of 200° F. The reaction mixture was held at 200° F. until an epoxy equivalent weight approaching infinity was obtained. The reaction product had a solids content of 100%. The amine equivalent weight of this product was 291.6 (theoretical 290.9).

Neutralization of the monoepoxide-imidazoline adduct

776 Grams of the monoepoxide-imidazoline adduct (from above) and 191 gms of 88% lactic acid were charged to a reaction kettle and heated to 100° F. The mixture was allowed to exotherm to 125° F. At 125° F., 2913 gms of deionized water was added slowly to disperse the resin. The reaction mixture was then held at 125° F. for 60 minutes (to hydrolyze the imidazoline ring). The dispersed resin had a 20% resin solids and a pH of 6.80.

Preparation of pigment paste from the neutralized monoepoxide-imidazoline resin

To prepare a pigment paste for this neutralized cationic pigment dispersant, the following ingredients were employed.

| Ingredients | Grams | Solids |
|---|---|---|
| 1. Neutralized resin (as described above) | 192.3 | 38.46 |
| 2. Surfynol 104A ® (defoamer from Air Products) | 1.92 | |
| 3. Clay | 57.97 | 57.97 |
| 4. pb Silicate | 24.88 | 24.88 |
| 5. Carbon black | 29.08 | 29.08 |
| 6. TiO$_2$ | 331.39 | 331.39 |
| 7. Dibutyltin oxide | 18.28 | 18.28 |
| 8. Deionized water | 244.18 | |

Ingredients 1-8 were blended together in a stainless steel beaker, grinding medium was then added and the resultant slurry ground to a Hegman No. 7 to 7½. The paste had a 58% solids content and a pH of 6.86. The pigment to binder ratio was 12:1.

Preparation of coating composition from pigment paste

A cationic electrodepositable paint was prepared from the '467 binder resin and the pigment paste described above.

| Ingredients | Grams | Solids |
|---|---|---|
| '467 binder resin | 415.5 | 147.5 |
| Pigment paste (as described above) | 56.3 | 32.5 |
| Deionized water | 428.2 | |

To the 415.5 gms of '467 binder resin, 428.2 gms deionized water was added followed by 56.3 gms of the pigment paste. This electrodeposition bath showed a pH of 6.48, had a solids content of 20% and a pigment to binder ratio of 0.2/1.0. Phosphated and base steel panels were coated at 225V for 135 seconds at a bath temperature of 83° F. The wet film was baked at 360° F. for 30 minutes to produce dry, smooth films having a film thickness of 1.16±0.03 mil. The cured film withstood 200 methyl ethyl ketone (MEK) double rubs.

EXAMPLE 2

Preparation of polyepoxide-imidazoline adduct

An Epon ® 828/Bisphenol A/Amine-imidazoline resin was prepared from the following ingredients.

| Ingredients | Grams | Solids |
|---|---|---|
| Epon ® 828 | 288 | 279.4 |
| Bisphenol A | 114 | 114 |
| Shell Catalyst ® 1201 | 0.288 | |
| Butyl Cellosolve ® | 371.5 | |
| Amine-imidazoline | 132 | 132 |

The Epon ® 828, bisphenol A and Shell Catalyst ® 1201 (an ethyltriphenyl phosphonium iodide catalyst) were charged to a reaction kettle and heated with a nitrogen sparge to 290° F. to initiate an exotherm with a peak temperature of 380° F. The reaction mixture was held at 350° F. until an epoxy equivalent weight of 800 was obtained. The reaction mixture was then cooled to 300° F., followed by thinning with Butyl Cellosolve ® and cooling to 200° F. The imidazoline amine was then added (all at once) and the reaction mixture was held at a temperature of 200° F. for about two hours (or until the epoxy equivalent weight approaches infinity) followed by cooling to room temperature. The reaction product had a solids content of 58%.

Neutralization of polyepoxide-imidazoline adduct 200 grams of the polyepoxide-imidazoline adduct (described above) and 14.5 gms of 88% lactic acid were charged to a reaction vessel and heated to about 100° F. The mixture was allowed to exotherm to about 125° F. 365.5 grams of deionized water was added slowly and the dispersed resin was held at 125° F. for 60 minutes. The neutralized resin solution had a solids content of 20% and a pH of 7.18.

Preparation of pigment paste from neutralized polyepoxide-imidazoline adduct

A pigment paste using the neutralized polyepoxide-imidazoline resin described above was prepared from the following ingredients.

| Ingredients | Grams | Solids |
|---|---|---|
| Neutralized grind resin (as described above) | 624 | 125 |
| Surfynol 104 ® (defoamer) | 6.25 | |
| Clay | 47.10 | 47.10 |
| pb silicate | 20.21 | 20.21 |
| Carbon black | 23.63 | 23.63 |
| TiO$_2$ | 269.25 | 269.25 |
| Dibutyltin oxide | 14.85 | 24.85 |
| Deionized water | 37.10 | |

The ingredients above were ground in zirconium media to a Hegman No. 7 to 7¼. The paste had a 47.9% solids and a pH of 7.11. The pigment to binder ratio was 3:1.

Preparation of coating composition from pigment paste

A cationic electrodepositable paint was prepared by using the '467 binder resin and the pigment paste (described immediately above) as follows:

| Ingredients | Grams | Solids |
|---|---|---|
| '467 binder resin | 1622.25 | 575.9 |
| Pigment paste (described above) | 342.5 | 164.1 |
| Deionized water | 1735.25 | |

The resulting electrodeposition bath showed a pH of 6.10, had a solids content of 20% and pigment to binder ratio of 0.2/1.0.

Phosphated and bare steel panels were electrodeposited in this electrodeposition bath at 340 volts for 135 seconds at a bath temperature of 87° F. The wet films were baked at 360° F. for 30 minutes to produce dry, smooth films having a film thickness of 0.7 mil and 0.8 mil, respectively. The cured film withstood 200 MEK double rubs.

EXAMPLE 3

A Ciba XB 4122 ®-Imidazoline dispersant resin was prepared from the following ingredients:

| Ingredients | Grams | Solids |
|---|---|---|
| Ciba XB 4122 ® | 1067 | 1067 |
| Imidazoline amine | 865.1 | 865.1 |
| Butyl Cellosolve ® | 480.2 | |

The Ciba XB 4122 ® (a diepoxy available from Ciba Geigy Chemical Company) and the imidazoline amine were charged to a reaction kettle and heated with a nitrogen sparge to 150° F. to initiate an exotherm with a peak temperature of 200° F. The reaction mixture was held at 200° F. for about 2 hours (or until the epoxy equivalent weight approached infinity), followed by thinning with Butyl Cellosolve ® to 80% solids.

Neutralization of the dispersant resin 200 grams of the dispersant resin (described immediately above) and 36.6 grams of 88% lactic acid were charged to a reaction vessel and heated to 100° F. The batch was allowed to exotherm to 125° F. At 125° F., 563.4 gms of deionized water was added slowly to disperse the resin. The reaction mixture was held at 125° F. for about 60 minutes. The dispersed resin had a 20% resin solids and a pH of 7.45.

Preparation of the pigment paste from the neutralized dispersant resin

A pigment paste using the neutralized pigment dispersant resin described above was prepared from the following ingredients:

| Ingredients | Grams | Solids |
|---|---|---|
| Neutralized dispersant resin | 192.3 | 38.46 |
| Surfynol 104 ® | 1.92 | |
| Clay | 57.97 | 57.97 |
| pb silicate | 24.88 | 24.88 |
| Carbon black | 29.08 | 29.08 |
| TiO$_2$ | 331.40 | 331.39 |
| Dibutyltin oxide | 18.28 | 18.28 |
| Deionized water | 244.20 | |

The ingredients were ground in zirconium media to a Hegman No. 7 to 7¼. The paste had a 54.1% solids and a pH of 7.77. The pigment to binder ratio was 12:1.

Preparation of a coating compositions from the pigment paste

A cationic electrodepositable paint was prepared from the pigment paste (described immediately above) and the '467 binder resin as follows:

| Ingredients | Grams | Solids |
|---|---|---|
| '467 binder resin | 923.38 | 327.8 |
| Pigment Paste | 133.5 | 72.2 |
| Deionized Water | 943.12 | |

The above ingredients were mixed and the resulting electrodeposition bath showed a pH of 5.84, had a solids content of 20% and pigment to binder ratio of 0.2/1.0.

Phosphated panels were electrodeposited in this paint at 340 volts for 135 seconds at a bath temperature of 87° F. The coated panels were cured at 360° F. for 30 minutes to produce dry, smooth films having a film thickness of 0.67 mil. The cured film withstood 200 MEK double rubs.

EXAMPLE 4

A Dow XU 71832 ®-Imidazoline dispersant resin was prepared from the following ingredients:

| Ingredients | Grams | Solids |
|---|---|---|
| Dow XU 71832 ® | 1400 | 1400 |
| Amine-imidazoline | 1116 | 1116 |

The Dow XU 71832 ® (a polyepoxide available from Dow Chemical Company) and the imidazoline amine were charged to a reaction vessel and heated with a nitrogen sparge to 150° F. to initiate an exotherm with a peak temperature of 200° F. The reaction mixture was held at 200° F. for about 2 hours (or until an epoxy equivalent weight approaching infinity is obtained). The reaction product had a solids content of 100%.

Neutralization of the dispersant resin 200 grams of the dispersant resin (described immediately above) and 44.7 gms of 88% lactic acid were charged to a reaction vessel and heated to 100° F. The batch was allowed to exotherm to 125° F. At 125° F., 755.3 gms of deionized water was added slowly to disperse the resin. The reaction mixture was held at 125° F. for 60 minutes. The dispersed resin had a 20% resin solids and a pH of 7.55.

Preparation of a pigment paste from the neutralized dispersant resin

A pigment paste using the neutralized pigment grind resin described above was prepared from the following ingredients.

| Ingredients | Grams | Solids |
|---|---|---|
| Neutralized dispersant resin | 192.3 | 38.5 |
| Surfynol 104 ® | 1.92 | |
| Clay | 57.97 | 57.97 |
| pb silicate | 24.88 | 24.88 |
| Carbon black | 29.08 | 29.08 |
| TiO$_2$ | 331.40 | 331.40 |
| Dibutyltin oxide | 18.28 | 18.28 |
| Deionized water | 244.20 | |

The ingredients were ground in a zirconium media to a Hegman No. of 7 to 7¼. The paste had a 54.1% solids and a pH of 7.77. The pigment to binder ratio was 12:1.

Preparation of a coating from the pigment paste

A cationic electrodepositable paint was prepared by using the pigment paste (described immediately above) and the '467 binder resin as follows:

| Ingredients | Grams | Solids |
|---|---|---|
| '467 binder resin | 923.38 | 327.8 |
| Pigment Paste | 133.5 | 72.2 |
| Deionized Water | 943.12 | |

The ingredients were mixed and the resulting electrodeposition bath showed a pH of 5.84, had a solids content of 20% and pigment to binder ratio of 0.2/1.0.

Phosphated panels were electrodeposited in this paint at 340 volts for 135 seconds at a bath temperature of 87° F. The coated panels were cured at 360° F. for 30 minutes to produce dry, smooth films having a film thickness of 0.67 mil. The cured film withstood 200 MEK double rubs.

EXAMPLE 5

Preparation of Epon 828 ®—Imidazoline Amine Adduct

This adduct was prepared from the following ingredients:

| Ingredients | Grams | Solids |
|---|---|---|
| Epon 828 ® | 600 | 578 |
| Imidazoline Amine | 828 | |
| Butyl Cellusolve ® | 357 | |

The Epon 828 ®, Imidazoline amine and Butyl Cellusolve ® were charged to a reaction kettle and heated with a nitrogen sparge to 150° F. to initiate an exotherm with a peak temperature of 200° F. The reaction mixture was held at 200° F. until an epoxy equivalent weight approaching infinity was obtained. The reaction product had a solids content of 80%.

Neutralization of Epon 828 ®—Imidazoline Amine Adduct 500 grams of the Epon 828 ®—Imidazoline amine adduct (described above), 109.9 grams of 88% lactic acid were charged to a reaction vessel and heated to about 100° F. The mixture was allowed to exotherm to about 125° F. 357 grams of deionized water was added slowly and the dispersed resin was held at 125° F. for 60 mins. The neutralized resin solution had a solids content of 25% and a pH of 7.18.

Preparation of a pigment paste from neutralized Epon 828 ®—Imidazoline Amine Adduct A pigment paste using the neutralized Epon 828 ®—Imidazoline amine resin described above was prepared from the following ingredients:

| Ingredients | Grams | Solids |
|---|---|---|
| Neutralized grind resin (as described above) | 152 | 38 |
| Surfynol 104 ® | 2.0 | |
| Clay | 58 | 58 |
| pb silicate | 25 | 25 |
| TiO2 | 332 | 332 |
| Dibutyl tin oxide | 18 | 18 |
| Deionized water | 414 | |

The ingredients above were ground in Zirconium media to a Heyman No. 7 to 7¼. The paste has a 56% solids content and a pH of 7.30. The pigment to binder ratio was 12:1.

Preparation of coating composition from pigment paste

A cationic electrodepositable paint was prepared by using the '467 binder resin and the pigment paste (described immediately above) as follows:

| Ingredients | Grams | Solids |
|---|---|---|
| '467 binder resin | 1154.20 | 409.73 |
| pigment paste (described above) | 161.20 | 90.27 |
| Deionized water | 1185 | |

The resulting electrodeposition bath showed a pH of 6.33, had a solids content of 20% and a pigment to binder ratio of 0.20/1.0.

Phosphated and base steel panels were electrodeposited in this electrodeposition bath at 175 volts for 135 secs. at a bath temperature of 83° F. The wet films were baked at 350° F. for 30 minutes to produce dry smooth films having a film thickness of 1.0 mils. The cured film withstood 200 MEK double rubs.

We claim:

1. An improved cathodic electrodepositable paint composition comprising an amine-epoxy resin and a blocked organic isocyanate crosslinking agent and pigment; wherein the improvement comprises the use of a pigment dispersant for dispersing pigment in the paint which consists essentially of the reaction product of (i) an organic monoepoxide or organic polyepoxide; and (ii) a compound with the structure:

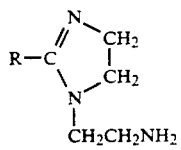

wherein R is $C_8$-$C_{24}$ alkyl group, said organic monoepoxide has the formula:

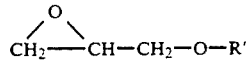

wherein R' is $C_{12}$-$C_{14}$ alkyl group and said organic polyepoxide is a monomeric or polymeric containing two or more 1,2, epoxy groups per molecule and wherein (i) and (ii) are reacted stoichemitrically so that there is not an excess of the compound or the epoxide.

2. The paint composition of claim 1 wherein said organic polyepoxide is a polyhydric ether of a polyhydric phenol.

3. The paint composition of claim 1 wherein said organic polyepoxide is a polyglycidyl ether or an alicyclic polyol.

4. The paint composition of claim 1 wherein said organic polyepoxide is a polyglycidyl ether of polyhydric alcohol.

5. The paint composition of claim 1 wherein said organic polyepoxide is a polyglycidyl ether of polyhydric phenol polyalkoxylate.

6. The paint composition of claim 1 wherein the pigment is in a pigment to binder ratio of 12:1 or more.

* * * * *